UNITED STATES PATENT OFFICE.

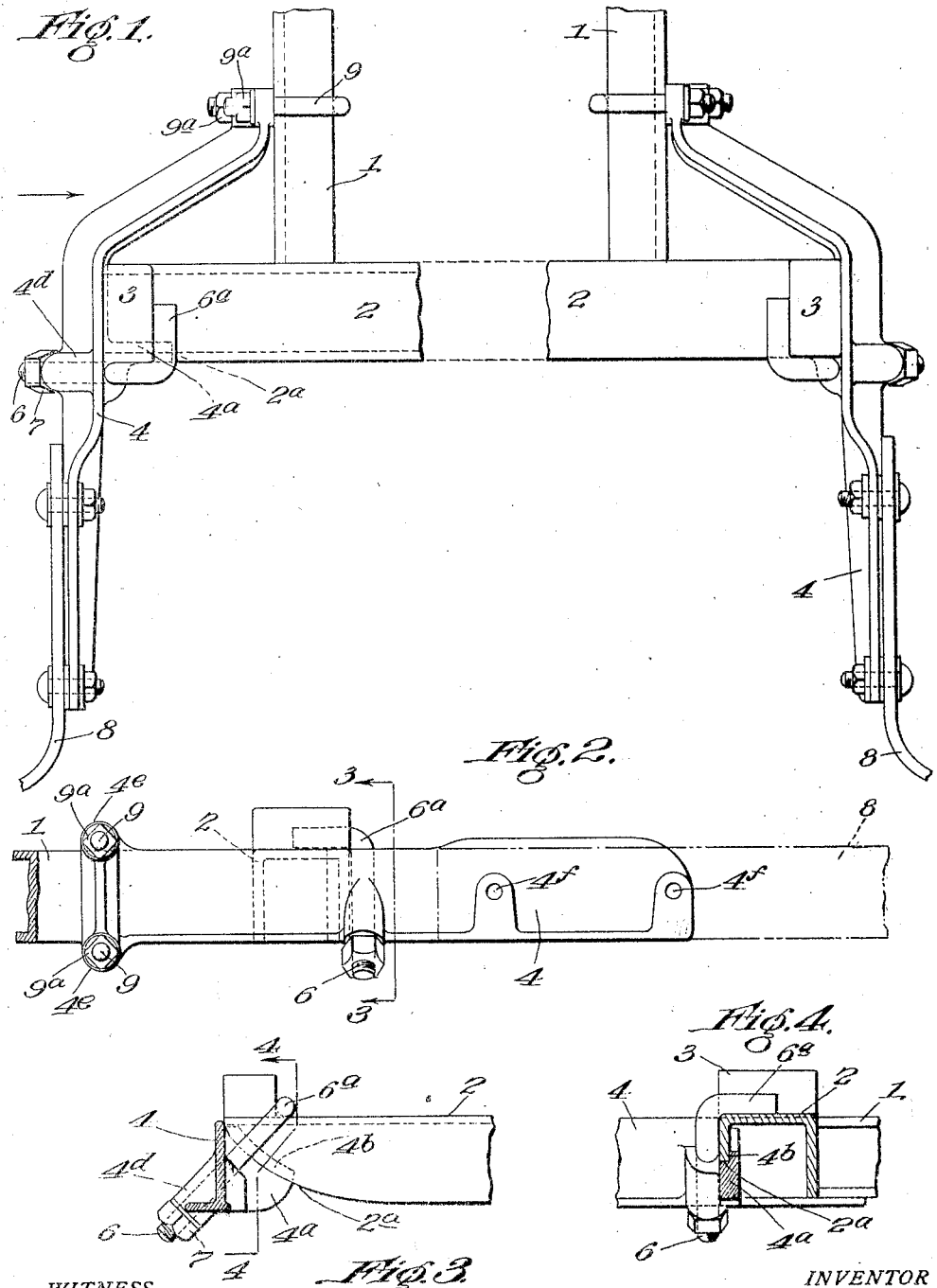

OSCAR H. GOETZ, OF CHICAGO, ILLINOIS, ASSIGNOR TO STEWART-WARNER SPEED-OMETER CORPORATION, OF CHICAGO, ILLINOIS, A CORPORATION OF VIRGINIA.

AUTOMOBILE-BUMPER.

1,379,097.  Specification of Letters Patent.  Patented May 24, 1921.

Application filed August 13, 1920. Serial No. 403,220.

*To all whom it may concern:*

Be it known that I, OSCAR H. GOETZ, a citizen of the United States, residing at Chicago, in the county of Cook and the State of Illinois, have invented certain new and useful Improvements in Automobile-Bumpers, of which the following is a specification, reference being had to the accompanying drawings, forming a part thereof.

The purpose of this invention is to provide an improved means of mounting a bumper on an automobile frame of the type and character which has longitudinally extending side bars and a connecting cross bar at the end of the side bars, being particularly designed for a rear bumper on a car of the Ford type. It consists in the elements and features of construction shown and described, as indicated in the claims.

In the drawings:—

Figure 1 is a plan view of a portion of the chassis body of a car having a bumper mount embodying this invention applied thereto.

Fig. 2 is an elevation of the same, looking in the direction of the arrow on Fig. 1.

Fig. 3 is a section at the line, 3—3, on Fig. 2.

Fig. 4 is a section at the line, 4—4, on Fig. 4.

In the drawings, 1, 1, are the side bars of an automobile frame of the Ford type. 2 represents the rear cross bar. Both the side bars and the cross bar are channel bars, the side bars having their channel opening inward and the cross bar having its channel opening downward. The cross bar extends beyond the side bars at the ends, and is crossed at the ends by an element of the frame structure which in general may be referred to as a body member, 3, making an inwardly and upwardly opening angle with the upper surface of the cross bar, 2. The flanges of the cross bar, 2, finish at the ends of the bar in an upward and outward slope, slightly curved, as seen at 2ª. 4 is the bracket or mount for securing a bumper which in general comprises a longitudinally extending bracket arm adapted to be applied across the end of the cross bar, 2, and having an inwardly projecting lug, 4ª, which abuts and fits substantially upon the downwardly and outwardly facing,—upwardly and outwardly extending—sloping edge 2ª, of the cross bar flange, the edge of the lug being rabbeted as seen at 4ᵇ, to form a lip which engages the flange, 2ᵇ, at the opposite side from that past which there is extended a clamping bolt, 6. This bolt is an L-hook bolt having its hook, 6ª, engaged in the angle between the upper surface of the cross bar, 2, and the crosswise extending member, 3. The bracket arm, 4, is preferably made as shown with the main body consisting of a vertical web and horizontal flange at the lower side. It has the obliquely extending boss, 4ᵈ, occupying the angle between the vertical web and the horizontal flange at the outer side, and being somewhat extended at the inner side of said web. And this boss is bored to receive the stem of the hook bolt, 5, in a direction which is transverse, and nearly at right angles, to the edge of the lug, 4ª, which abuts upon the sloping edge, 2ª, of the flange of the cross bar, 2; so that the hook bolt having its hook member engaged, as stated, in the angle between the cross bar, 2, and the member, 3, extending through said lug and secured by the tightening nut, 7, clamps the lug, 4ª, tightly against the sloping edge, 2ª, and thereby operates for binding the bracket arm firmly against the end of the cross bar. At the opposite side of the cross bar from that at which the bolt is positioned, the bracket arm is deflected inward to reach the outer side of the side bar, 1, where it is provided with suitable lugs, 4ᵉ, 4ᵉ, for receiving the ends of a U-bolt, 9, which clasps the side bar and is secured by tightening nuts 9ª, on its outer ends.

Any desired form of impact-receiving bumper may be secured to the longitudinally extending bracket arm, 4, which are provided with bolt holes, 4ᶠ, for that purpose. 6 represents a fragment of the supporting arm of such an impact receiving device.

I claim:—

1. In combination with an automobile frame having longitudinal side bars and a cross bar which joins them and which has at the end and under side an edge sloping up outwardly and a member which crosses the end of the cross bar above the same, making an upwardly and inwardly opening angle therewith, a longitudinally extending bracket arm having an inwardly-projecting lug which abuts and fits substantially against said sloping edge and an L-hook bolt having its hook engaging said angle and a stem extending through the bracket arm in a direction transverse to said slope, and tightening means on the end of the bolt.

2. In combination with an automobile frame having longitudinal side bars and a cross bar which joins them and which has at the end and under side an edge sloping up outwardly and a member which crosses the end of the bar above the same, making an upwardly and inwardly opening angle therewith; a longitudinally extending bracket arm secured to the side bar and extending thence past the edge of the cross bar and having an inwardly-projecting lug which abuts and fits substantially against said sloping edge, and an L-hook bolt having its hook engaging said angle and its stem extending through the bracket arm in a direction transverse to said slope, and attaching means on the end of the bolt, the transverse bar of the frame being a flanged bar, and a vertical flange thereon having the sloped edge, the lug being rabbeted at its edge abutting on said slope to form a lip which engages at the opposite side of said flange of the cross bar from that past which the bolt stem extends.

In testimony whereof I have hereunto set my hand at Chicago, Illinois, this fifth day of August, 1920.

OSCAR H. GOETZ.